Figure 1:
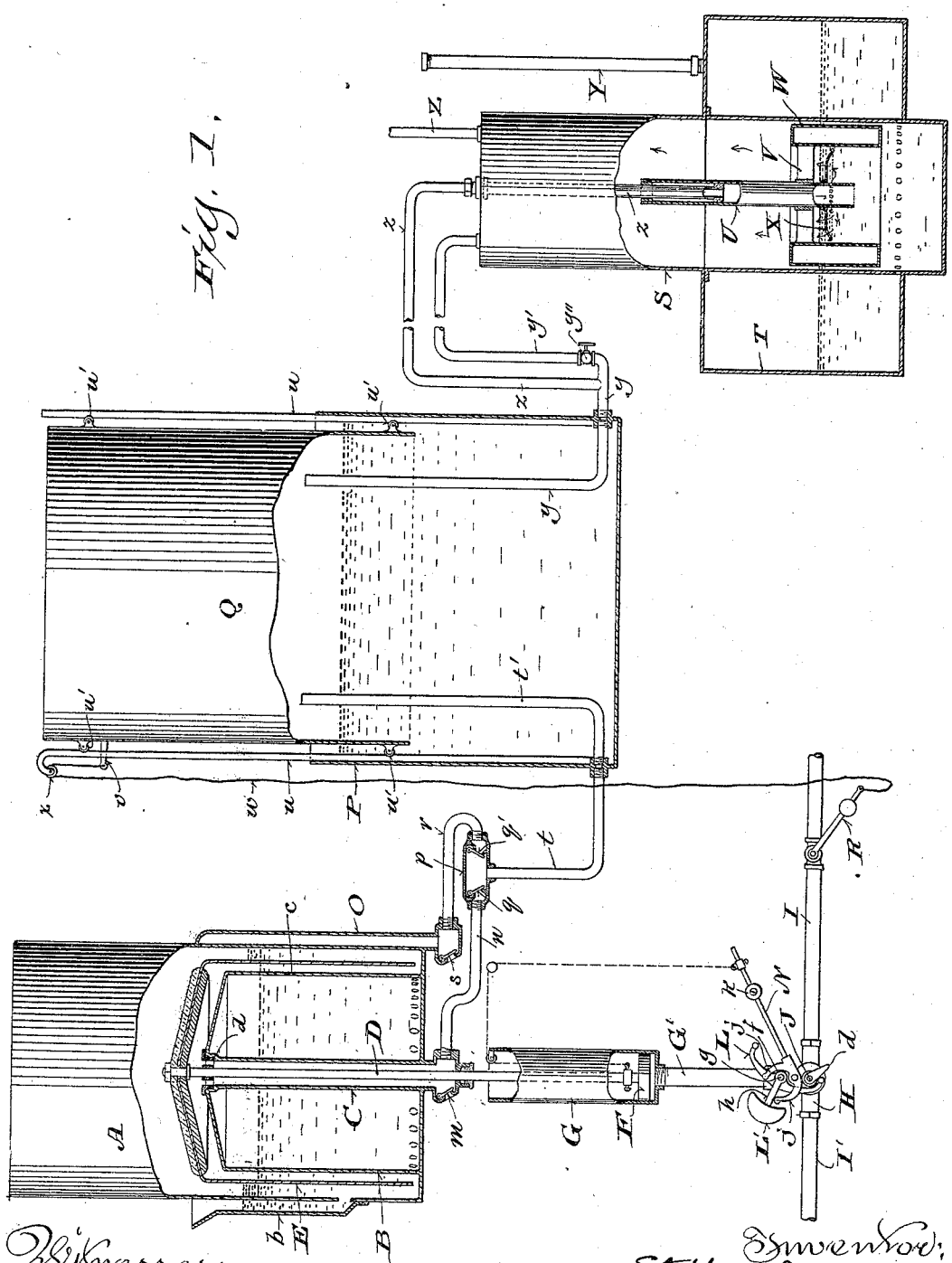

No. 643,397. Patented Feb. 13, 1900.
S. BROICHGANS.
CARBURETER.
(Application filed Mar. 23, 1899.)

(No Model.) 2 Sheets—Sheet 1.

Witnesses:
Geo. N. Young
N. E. Oliphant

Inventor:
Stephan Broichgans
By H. G. Underwood
N. Norway

No. 643,397. Patented Feb. 13, 1900.
S. BROICHGANS.
CARBURETER.
(Application filed Mar. 23, 1899.)
(No Model.) 2 Sheets—Sheet 2.
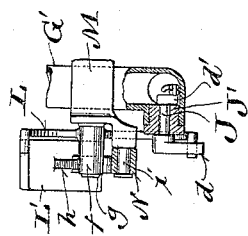
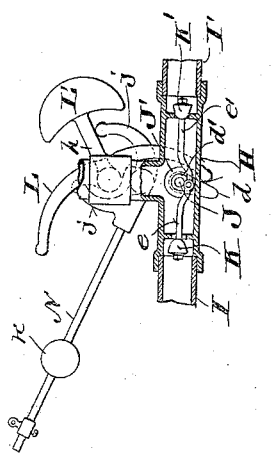
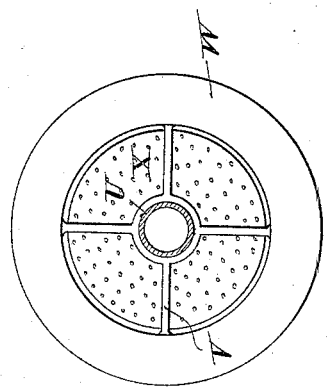
Witnesses:
Geo. W. Young.
N. E. Oliphant.
Inventor:
Stephan Broichgans
By H. G. Underwood

UNITED STATES PATENT OFFICE.

STEPHAN BROICHGANS, OF MILWAUKEE, WISCONSIN.

CARBURETER.

SPECIFICATION forming part of Letters Patent No. 643,397, dated February 13, 1900.

Application filed March 23, 1899. Serial No. 710,184. (No model.)

*To all whom it may concern:*

Be it known that I, STEPHAN BROICHGANS, a citizen of the United States, and a resident of Milwaukee, in the county of Milwaukee and State of Wisconsin, have invented certain new and useful Improvements in Carbureters; and I do hereby declare that the following is a full, clear, and exact description thereof.

My invention has for its object to provide simple, economical, antifreezing, and automatic domestic carbureting apparatus by which the objection on the part of fire-insurance companies to indoor exposure of liquid hydrocarbon is avoided; and said invention consists in certain peculiarities of construction and combination of parts hereinafter particularly set forth with reference to the accompanying drawings and subsequently claimed.

Figure 1 of the drawings is a diagram illustrating in elevation and section the general construction and arrangement of parts constituting my improved domestic curbureting apparatus; Figs. 2 and 3, detail partly-sectional views of a valve mechanism embodied in the apparatus; and Fig. 4, a detail plan view of a float-encompassed reticulated screen, also embodied in said apparatus.

Referring by letter to the drawings, A represents a closed tank having a central chamber B, that rises from its bottom, the lower end of the chamber being perforated. The dimensions of the tank and chamber are such that space is formed between their vertical walls for a volume of water that being run into said tank through a funnel-pipe $b$ finds its way into said chamber through the perforations in the lower end of same, this chamber being provided with a vent-hole $c$, that permits ascent of said water to the elevation shown. Owing to difference in height of the tank and chamber therein the water-level in one will be higher than in the other, as herein shown, and the water in said chamber is a reserve supply that compensates for loss of that outside the same by evaporation or otherwise.

The chamber B is provided with a central vertical tube C, open at its upper end, where it joins the otherwise-closed top of said chamber, and this tube is in union with the tank-bottom through which it extends. The upper end of tube C is provided with a guide-spider $d$ for a rod D, and the latter extends down through a stuffing-box at the lower end of said tube. The upper end of the rod is made fast to the top of a weighted open-bottom jacket E surrounding the chamber B in tank A, and as a matter of detail the jacket may be of sheet metal having weight-plates fast to its closed upper end upon the inside and outside of same, this construction being herein shown. The rod D is for connection with a motor that operates to elevate jacket E, and as herein shown the motor may comprise a piston F on the lower end of said rod, a cylinder G containing the piston, valves controlling inlet and exhaust of fluid under pressure with respect to the cylinder, and an automatic valve-shifting mechanism.

In detail the cylinder G is herein shown as having the lower end thereof in communication with a casing H, the ends of which are in union with an inlet-pipe I and an outlet-pipe I' for water or other fluid under pressure, it being practical to have said inlet-pipe in connection with a city water-service system. A spindle J, having its bearing in a screw-threaded plug J, constituting part of the casing H, is provided at its ends with cranks $d\ d'$, and the latter crank inside of said casing has connection with the stems $e\ e'$ of valves K K', employed to control the inlet and outlet of the aforesaid casing. The outer crank $d$ of spindle J is in the path of the extremities of a curved rocker L, having a central sleeve portion $f$ loose on a horizontal pivot-stem $g$, constituting part of a bracket M, rigid with a pipe G', connecting cylinder G and valve-casing H aforesaid. Extending radially from sleeve $f$ across the rocker L is a shank $h$, and a weight L' is in rigid connection with the outer end of said shank. Loose on another pivot-stem $i$ of the bracket M is a weighted lever N, having the butt or fulcrum end thereof provided with a pair of curved branches $j$, constituting a fork, these fork branches of said lever being operative against the weighted shank $h$ of the rocker above specified. Beyond the weight $k$ thereon the lever N is flexibly connected to the piston-rod D, the flexible device being supported by pulleys arranged as shown in Fig. 1.

The tube C aforesaid has its lower outer end enlarged to obtain clearance for an inwardly-opening check-valve $m$ governing an air-inlet, and leading from this enlarged end of said tube is a pipe $n$ in union with one end of a casing $p$ opposite an inwardly-opening check-valve $q$ therein, and the opposite end of this casing is likewise provided with an inwardly-opening check-valve $q'$ opposite a pipe $r$, connecting said casing with the enlarged lower end of a vertical flue O parallel to tank A and in communication with the same above the level of the liquid therein, said enlarged end of the flue being provided with an inwardly-opening check-valve $s$ controlling an air-inlet. Leading from the casing $p$ is a pipe $t$ in union with the lower portion of a tank P, that is partially filled with water, and a continuation $t'$ of this pipe extends up in the latter tank above the level of the liquid therein. The tank P is provided with inside vertical rails $u$, that extend above its rim and constitute tracks for antifriction-rollers $u'$, carried by an air-holder Q, the latter being an open-bottom shell that is always more or less submerged in the liquid contents of the adjacent tank.

Extending from the upper portion of the air-holder is an arm $v$, and made fast to this arm is a flexible device $w$, run over a pulley $x$, hung from one of the vertical rails $u$ aforesaid. The lower end of the flexible device $w$ has connection with the outer end of a weighted lever R, by which a cut-off valve of pipe I is operated, the length of said flexible device being such as not to come taut until the air-holder has a predetermined degree of descent. Except in matters of detail the apparatus thus far described is similar to what has been set forth in my now pending application, Serial No. 693,102, filed October 10, 1898.

Leading from inside the air-holder above the liquid contents of tank P is a pipe $y$ in union with the lower portion of said tank, and a valve-controlled continuation $y'$ of the pipe outside the aforesaid tank has connection with the upper portion of a cylinder S, that extends down through a tank T for gasolene or other liquid hydrocarbon, this cylinder being provided with inlet-apertures near the bottom of the latter tank inside the same. A branch $z$ of pipe $y$ leads from the latter between the tank P and cut-off valve $y''$, controlling the continuation $y'$ of said pipe, and said branch extends down through the top of cylinder S central of the same. In telescopic connection with pipe $z$ inside cylinder S is a tube U, fast in the hub of a spider V, rigid in the upper portion of a float W in the form of a cylindrical air-tight shell, and fast on the tube below the spider is a reticulated screen X, said tube being provided with apertures immediately under the screen. The disposition of the screen is such that it is submerged in gasolene or other liquid hydrocarbon that finds its way through the apertures in cylinder S from tank T, and in practice said tank is buried in the ground below frost-line as far from any building as the regulations of fire-insurance companies may require, the liquid hydrocarbon being run into the aforesaid tank through a pipe Y, that extends above the ground-surface and is provided with a suitable cap.

Leading from the top of cylinder S is a service-pipe Z for gaseous product generated in the manner hereinafter set forth.

The various parts of the above-described apparatus being in the arrangement shown in Fig. 1, there will be gravity descent of the holder Q, and the air accumulated in said holder is forcibly expelled through the piping $y z$ to find escape out of the apertures in tube U, whereby it has diffusion in the liquid hydrocarbon to become saturated with the same, the result being an ignitible gaseous product that rises in cylinder S through the reticulated screen X to find its way under pressure through a distributing system of which service-pipe Z forms a part. The submerged reticulated screen X above the tube-apertures insures a proper diffusion of the air in the liquid hydrocarbon to obtain the best results, and at any time the gaseous product is too rich in hydrocarbon the valve $y''$, controlling the continuation of extension $y'$ of pipe $y$, is opened to admit additional air direct from the holder Q into the cylinder above the float encompassing said screen. When the air-holder has descended a predetermined distance, the flexible device $w$ will come taut and operate to elevate the weighted valve-lever R, whereby the pipe I is opened. The valve K, having been previously unseated simultaneous with a seating of valve K', there is flow of fluid under pressure against piston F to cause elevation of the weighted open-bottom jacket E in tank A, this operation causing check-valve $m$ to open the air-inlet which it governs. The air displaced in tank A by rise of the jacket E finds escape through the flue O and piping $r t t'$ into the aforesaid holder, the check-valve $q'$ being swung open in casing $p$ when this operation takes place. As the piston F rises in cylinder G there is slack of the flexible device connecting the piston-rod D and weighted lever N, whereby said lever is permitted to descend, one of its fork branches $j$ operating against pivotal shank $h$ to shift the weight L' past the center of gravity in a direction opposite that herein shown. The rocker L is moved by its weighted shank L', and upon automatic descent of this shank said rocker operates on crank $d$ to shift the valves K K', whereby the first of these valves is seated and the other unseated to shut off casing H from inlet-pipe I and open said casing to outlet or waste pipe I', thus permitting gravity descent of the jacket E aforesaid, this operation causing check-valve $s$ to open the air-inlet which it governs. The air displaced from within the jacket E through the tube C finds its way through piping n t t' into holder Q, the check-valve q being swung open in casing p when this operation takes place. As the piston F descends in the cylinder the weighted lever N is lifted and the mechanism operative in conjunction therewith causes shift of valves K K' to the position herein illustrated. Therefore it will be understood that there is reciprocation of said piston and jacket in connection therewith as long as the weighted valve-lever R is elevated; but when sufficient air is accumulated in holder Q to cause ascent of same the flexible device w slackens and permits descent of said lever to cut off the motor for the double-acting pump from fluid under pressure employed as the primary motive force.

Having thus described my invention, what I claim as new, and desire to secure by Letters Patent, is—

1. A carbureting apparatus comprising a tank for liquid hydrocarbon, an apertured cylinder partly within the tank, a float movable in the cylinder, a float-supported air-tube in telescopic union with a stationary air-conveyer and provided with apertures below the level of the liquid hydrocarbon, a float-encompassed reticulated screen surrounding the tube above its apertures to have submergence in said liquid hydrocarbon, a service-pipe leading from said cylinder, and an automatic air-supply mechanism.

2. A carbureting apparatus comprising a tank for liquid hydrocarbon, an apertured cylinder partly within the tank, a float movable in the cylinder, a float-supported air-tube in telescopic union with a stationary air-conveyer and provided with apertures below the level of the liquid hydrocarbon, a float-encompassed reticulated screen surrounding the tube above its apertures to have submergence in said liquid hydrocarbon, a service-pipe leading from said cylinder, and an automatic air-supply and storage mechanism.

3. A carbureting apparatus comprising a tank for liquid hydrocarbon, an apertured cylinder partly within the tank, a float movable in the cylinder, a float-supported air-tube provided with apertures below the level of the liquid hydrocarbon, a stationary air-conveyer with which said tube has telescopic connection, a float-encompassed reticulated screen surrounding the aforesaid tube above its apertures to have submergence in said liquid hydrocarbon, a double-acting air-forcing apparatus in communication with said conveyer, and a service-pipe leading from said cylinder.

4. A carbureting apparatus comprising a tank for liquid hydrocarbon, an apertured cylinder partly within the tank, a float movable in the cylinder, a float-supported air-tube provided with apertures below the level of the liquid hydrocarbon, a stationary air-conveyer with which said tube has telescopic connection, a float-encompassed reticulated screen surrounding the aforesaid tube above its apertures to have submergence in said liquid hydrocarbon, a reciprocative air-holder in communication with said conveyer, a double-acting air-forcing mechanism in communication with the air-holder, motor-control mechanism operative in conjunction with said holder, and a service-pipe leading from said cylinder.

5. A carbureting apparatus comprising a tank for liquid hydrocarbon, an apertured cylinder partly within the tank, a float movable in the cylinder, a float-supported air-tube provided with apertures below the level of the liquid hydrocarbon, a stationary air-conveyer with which said tube has telescopic connection, a float-encompassed reticulated screen surrounding the aforesaid tube above its apertures to have submergence in said liquid hydrocarbon, an automatic air-forcing mechanism in communication with said conveyer, a valve-controlled conveyer branch having discharge into the upper portion of the cylinder, and a service-pipe leading from said cylinder.

In testimony that I claim the foregoing I have hereunto set my hand, at Milwaukee, in the county of Milwauke and State of Wisconsin, in the presence of two witnesses.

ST. BROICHGANS.

Witnesses:
 N. E. OLIPHANT,
 B. C. ROLOFF.